United States Patent [19]
Ballain et al.

[11] 3,943,064
[45] Mar. 9, 1976

[54] HIGH STRENGTH ALUMINA-SILICA CATALYST SUBSTRATES HAVING HIGH SURFACE AREA

[75] Inventors: Marlyn D. Ballain, Belleville, Ill.; Leroy D. Hart, St. Louis, Mo.

[73] Assignee: Aluminum Company of America, Pittsburgh, Pa.

[22] Filed: July 11, 1974

[21] Appl. No.: 487,643

[52] U.S. Cl............ 252/455 R; 252/477 R; 106/69
[51] Int. Cl.²......................................... B01J 29/06
[58] Field of Search.................... 252/455 R; 106/69

[56] References Cited
UNITED STATES PATENTS

| | | | |
|---|---|---|---|
| 2,563,650 | 8/1951 | Heinemann | 252/455 R |
| 2,941,958 | 6/1960 | Connor, Jr. et al. | 252/455 R |
| 3,146,210 | 8/1964 | Baldwin | 252/455 R |
| 3,184,414 | 5/1965 | Koch et al. | 252/455 R |

*Primary Examiner*—Carl F. Dees
*Attorney, Agent, or Firm*—John P. Taylor

[57] ABSTRACT

Catalyst substrates characterized by superior structural properties and a subsequent high degree of catalytic activity are produced by using a blend of colloidal silica and specially activated alumina which blend is subsequently rehydrated and activated under certain specified conditions. In a preferred embodiment the substrate is activated at a temperature of 1200°–1400°C to provide a substrate characterized by the absence of free silica.

8 Claims, 1 Drawing Figure

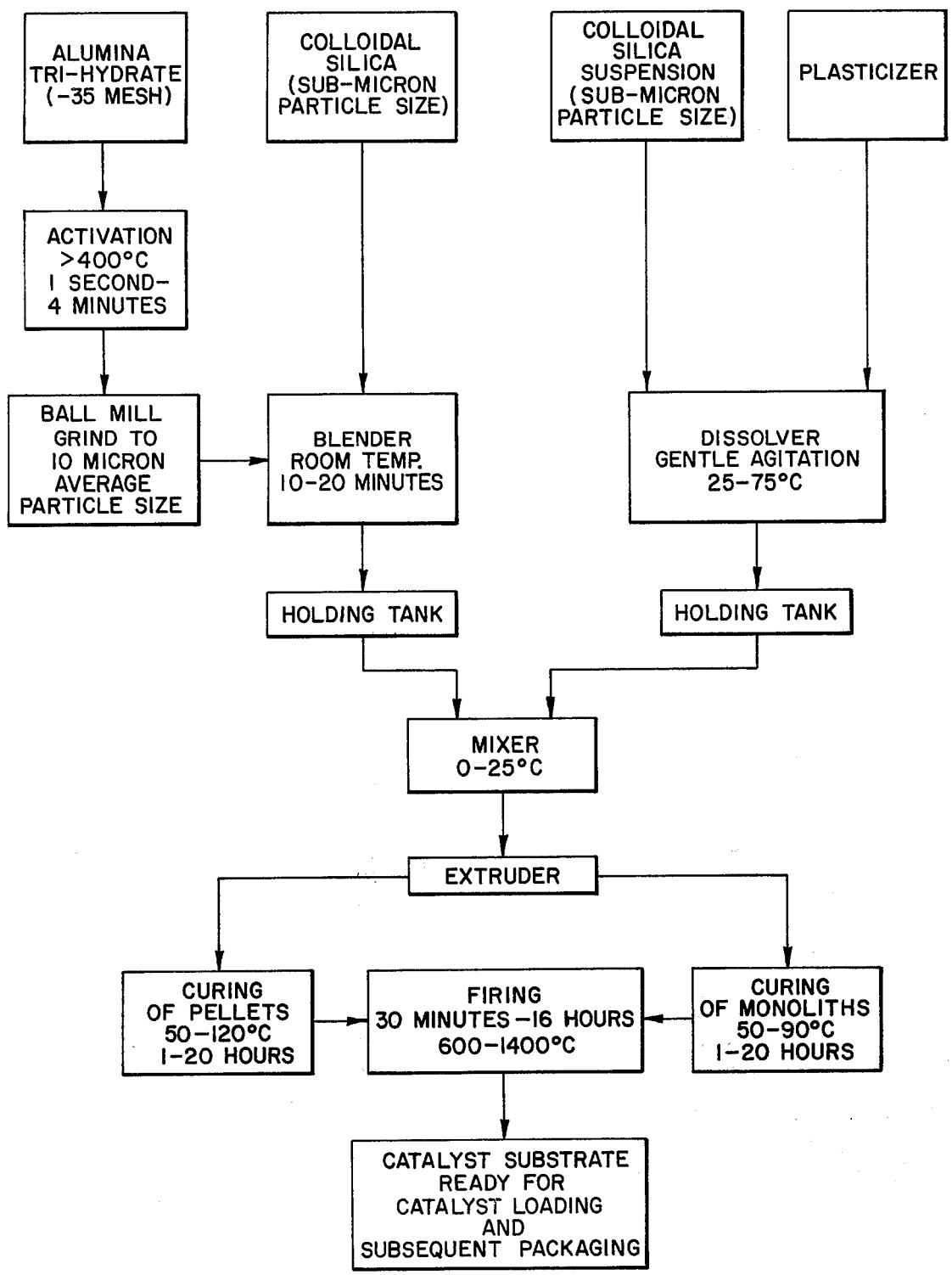

HIGH STRENGTH ALUMINA-SILICA CATALYST SUBSTRATES HAVING HIGH SURFACE AREA

CROSS-REFERENCE TO RELATED APPLICATIONS

This application is related to U.S. application Ser. No. 487,647, entitled "System for Rehydration or Curing of Shaped Activated Green Ceramic Structures", filed concurrently in the name of Marlyn D. Ballain.

BACKGROUND OF THE INVENTION

This invention relates to catalyst substrates and more particularly to an alumina-silica catalyst substrate characterized by high strength, high relative surface area and good thermal stability.

A need exists for a catalyst support having not only the porosity characteristics necessary for proper catalyst loading but good structural properties as well. Such structural properties include resistance to high temperature and thermal shock. Preferably, the material comprising the support should be extrudable, in the green state, into complex shapes when desired to provide, for example, higher surface contact area.

For example, the anti-polution standards proposed for the reduction of hydrocarbon emissions from internal combustion engines have created a need for a catalyst substrate having a pore structure and surface area such that a catalyst structure having a high degree of catalytic activity with a minimum amount of active catalyst material and at the same time exhibiting structural strength and resistance to high temperatures and thermal shock can be produced.

It has been proposed to provide such a structure using non-porous ceramics such as cordierite which, after extrusion and firing, are coated with activatable alumina to provide porosity for subsequent catalyst loading.

However, the added step required to coat the fired non-porous substrate is costly. Furthermore, it is desirable to provide a material having higher porosity and temperature resistance.

It has also been previously proposed to use alumina in combination with silica in the form of finely divided particles such as silica gel or the like to form catalyst supports, for example, in U.S. Pat. Nos. 2,307,878; 2,356,303; and 2,565,215. However, in none of these patents is it proposed to provide a catalyst support characterized by high surface area as well as good structural strength and thermal stability. There also appears to have been some recognition in the art that the addition of colloidal silica to impure forms of alumina such as bauxite can increase the hardness of the resultant product. Heinemann, in U.S. Pat. Nos. 2,563,650 and 2,603,609 indicates that colloidal silica may be added to activated bauxite to produce a product which is harder than the initial bauxite itself. However, it is not at all clear that the indicated additional hardness is attributable to the alumina and silica alone as opposed to the additional impurities contained therein. In fact, in Venable U.S. Pat. No. 2,899,323 and Baldwin U.S. Pat. No. 3,146,210 it is taught that one should use a third ingredient which respectively is either a metal oxide or aluminum nitrate to obtain an increased hardness of the resulting product.

There remains, therefore, a need to provide a porous alumina-silica catalyst substrate which exhibits relatively high surface area without sacrificing the strength and hardness which is previously indicative only apparently of the use of such materials in combination with other additives such as metal oxides or the like, or as previously mentioned, by using non-porous substrates coated with alumina.

SUMMARY OF THE INVENTION

In accordance with the invention, we have discovered that if aluminum oxide is activated in a particular manner, then mixed with colloidal silica, shaped into the desired final form, rehydrated under controlled conditions, and then subsequently fired within a particular temperature range, the resulting product is characterized by high relative surface area as well as good structural strength and refractoriness, i.e., retains its physical characteristics even when subjected to high temperatures such as would be encountered in an auto exhaust system. If the temperature range is exceeded, the resultant product, while exhibiting satisfactory structural strength, possesses very little surface area. Conversely, if the material is fired at too low a temperature, the resultant product is characterized by a high surface area but relatively low structural strength.

In accordance with the invention, an alumina-silica catalyst support characterized by surface area of at least 5 square meters per gram, a minimum compressive strength of 17 mega Pascals (mPa), an abrasive resistance of under 5% weight loss, and a thermal stability at temperatures as high as 1400° C is provided. The catalyst support comprises initially a mixture of colloidal silica and an alumina activated by exposure to a temperature of at least 400° C for a period of from 5–10 microseconds to not exceeding 4 minutes and preferably about 1–5 seconds, which mixture is subsequently rehydrated by exposure to an elevated temperature of from 50°–90° C for a period of 1–20 hours and then subsequently fired at a temperature of not less than about 600° nor more than about 1400° for a time period of from 30 minutes to 16 hours. When the activated mixture is extruded into a monolithic or shaped thin-wall structure — as opposed to a pellet — it is preferably aged in the presence of moisture.

In a particularly preferred embodiment of the invention, the substrate is further characterized by a substantial absence of free silica by firing the substrate at a temperature of at least 1200° C.

BRIEF DESCRIPTION OF THE DRAWING

The sole drawing of the invention is a flowsheet illustrating the ingredients and processing conditions of the invention.

DESCRIPTION OF THE INVENTION

In accordance with the invention, a highly activated alumina is combined with a colloidal silica, and following shaping of the mixture into desired shape or form and rehydration, fired in a particular temperature range to obtain the desired catalyst support.

The activated alumina used in the invention comprises alumina which has been activated in a particular manner to render it highly reactive upon rehydration with water. In accordance with the invention, the alumina is activated by exposing it to a temperature exceeding 400° C for a period from 1–2 seconds to about 4 minutes. This can be accomplished, for example, by passing alumina through a zone in contact with very hot gases wherein the residence time of the alumina is maintained within the desired recited period. The alumina should have a particle size range of −35 mesh (Tyler) and preferably −48 mesh. The alumina can be either ground or unground and can range in size from the maximum size recited down to ultrafines.

The amount of the activated alumina used in the alumina-silica mixture comprises from 72 to 90% by weight of the mixture. The colloidal silica used in the mixture comprises about 10 to 28% by weight of the mixture. Particularly where the absence of free silica is desired as will be discussed, the amount of silica used should not exceed the stoichiometric amount needed to produce a mullite ($3Al_2O_3 2SiO_2$) which comprises 28% by weight silica. The colloidal silica may be in dry form or present as an aqueous dispersion or suspension. The percentage by weight, however, of the mixture is based on the weight of the silica itself whether in dry form or in a liquid dispersion. The term "colloidal silica" is intended to define a silica having a submicron particle size. The particle size may be as small as 100 to 200 Angstroms (0.01–0.02 micrometers or microns).

While any form of silica having a colloidal particle size range has been found useful in the invention, it has been found that colloidal silica having a basic pH, when suspended in a liquid, performs slightly better than silica in suspensions which are acidic.

In accordance with the invention, the activated alumina and the colloidal silica are mixed together and sufficient water added, if necessary, to provide a doughy-like consistency. If necessary, a plasticizing agent such as, for example, polyethylene glycol may be added as well to assist in further molding or extruding of the dough-like mixture into desired catalyst support shapes. Examples of other organic plasticizers which may be used include carbon methyl cellulose, and ethylene oxide. The amount of such plasticizer materials used by total weight of the extrusion mixture varies from 0.02% to 8% by weight. To prevent premature rehydration of the alumina the mixture is kept within a temperature range of approximately 0°–22° C.

It has also been found that certain clay-like materials such as bauxite, kaolin, bentonite, Fuller's earth, and slip clay, all of which contain a mixture of alumina and silica, can be substituted for a portion of the colloidal silica to assist in the extrudability of the mixture. Thus, up to about 80% by weight of the colloidal silica may be substituted for by any of the above clay materials. While alumina, even without colloidal silica will, together with the clays form material with excellent extrusion characteristics, the formed substrate will not, upon firing, develop the excellent surface area and crushing strength of the ceramic mixture of the invention. Thus, the use of such clays in substitution for colloidal silica is to be limited to the amount specified to prevent interference with the desired ultimate physical characteristics of the fired substrate.

As stated above, the green ceramic mixture may be extruded into various shapes, such as, for example, honeycomb and asterisk structures, as well as into pellets or the like depending upon the desired application. In accordance with the invention, the green ceramic mixture has been found to have excellent green strength thus permitting its retention of extruded shapes when such are desirable as, for example, one manufacturing a catalyst substrate for use in an automobile exhaust where it is desired to not only have a high internal surface area but a high structural or external area through which the exhaust gases may pass and therefore contact the active material contained in the pores of the substrate.

Following the extrusion or shaping by any desired shaping or fabricating methods of the green ceramic, the unfired substrate is rehydrated by exposure to an elevated temperature of about 50°–90° C for a period of about 1–20 hours to permit the water in the green ceramic to chemically recombine with the activated alumina. It is important to prevent the temperature from falling below 50° C or rising above 90° C as this will have a deleterious effect on the green strength of shaped extrusions. Somewhat higher temperatures — of up to about 110°–120° C may be tolerated for extruded pellets. Preferably, when thin-walled extrusions or monoliths, i.e., honeycomb structures, are rehydrated, the rehydration is carried out in a liquid bath containing a liquid which is not a solvent for the monolith components. This has been found to prevent cracking of the substrates during rehydration and subsequent drying by sealing in the moisture present within the ceramic as well as permitting better temperature control. Such a curing media is more completely described in the copending patent application of one of us filed concurrently with this application and cross-referenced above. For purposes of this invention a thin-wall extrusion, in contrast to a pellet, is defined as an extrusion having a wall thickness of 0.159 cm or less.

In accordance with the invention, the rehydrated structure is fired at a temperature of not less than 600° C nor more than 1400° C for a period of time of from 30 minutes to 16 hours. The temperature must exceed about 600° C to provide sufficient structural strength as will be discussed below. However, if the firing temperature exceeds about 1400° C, for example 1500° C, the resulting structure has excellent structural strength but very little surface area thus preventing adequate subsequent catalyst loading. It should be noted here that the subsequent operating temperatures to which the substrate may be exposed can exceed 1400° C without deleterious effect since the catalyst will have already been loaded into the pores prior to said exposure.

In a preferred embodiment of the invention, it has been found desirable to produce a substrate having relatively little, if any, free silica. While it is difficult to analyze for the presence of free silica in a substance containing bound silica such as a mullite structure, the presence of free silica in the fired ceramic can be measured by using X-ray diffraction techniques to within about 5% accuracy.

To inhibit the presence of free silica in the final fired substrate without interfering with the structural strength desired, it has been found, in a preferred embodiment of the invention, that the substrate should be fired at a temperature of from about 1200° C to 1400° C. This provides a fired substrate having little, if any, free silica which is thought to be a deleterious material when the catalyst support is exposed to products which might poison the activated surface as in, for example, automotive exhaust systems or if the catalyst support is subsequently exposed to higher temperatures during operation which may result in transformation of such free silica into non-porous phases preventing access to the active material.

In accordance with the invention, the resultant catalyst substrate has been found to have a structural strength of approximately 13.5 mPa to 21.0 mPa. For definitional purposes herein, a substrate having a compressive strength of greater than 6.9 mPa is deemed to be a substrate possessing satisfactory high structural strength.

The substrate is also characterized by a high relative surface area. The term "relative" is used because the amount of surface area does decrease with firing temperature. Thus, for example, substrates made in accordance with the invention and fired at about 1000° C contain a surface area of about 100 square meters per gram ($m^2/g$) as opposed, for example, to about 50 $m^2/g$ when 100% alumina is fired at the same temperature.

The abrasive resistance of the catalyst substrates of the invention is determined by exposing 60 cc of substrate material of known weight to a fluidizing gas at 4.5 SCFM in a 1000 ml flask having an exhaust port therein fitted with a 14 mesh screen to permit fine particles abraded from the substrates and entrained in the gas to pass therethrough. After exposure for 5 minutes, the substrate material is removed and reweighed to determine the weight loss. Substrates with weight losses of 5% or less are considered to have good abrasive resistance.

The material also is found to exhibit excellent thermal stability, that is, retaining of strength at elevated temperatures or, after exposure to elevated temperatures. Such elevated temperatures, for example as may be found in the exhaust system of an automobile, may reach as high as 1450° C. Thus, a substrate having good thermal stability is defined herein as a substrate capable of withstanding operating temperatures (after catalyst loading) as high as 1450° C without substantial degradation of the physical characteristics of the substrate. The following examples are offered to further illustrate the invention.

EXAMPLE I

Three-hundred twenty-eight grams of activated alumina which was previously activated by contact for about 30 seconds with air heated to about 400° C and then ground to an average particle size of 10 micrometers was thoroughly blended with 82 grams of kaolin. The plasticizer mix was prepared using 100 grams of water, 100 grams of colloidal silica suspension (Syton-FM) and 2 grams of a water soluble ethylene oxide resin available under the trademark "PolyOX-WSR" from Union Carbide. The colloidal silica solution-suspension was heated to 70° with gentle agitation and the ethylene oxide resin was added gradually.

The blended solids and extrusion slip were then mixed in a Brabander Sigma mixer. A mixing time of 10 minutes was required. The mix was then extruded through a ⅛ inch diameter pellet extrusion die from which pellets ⅛ inch dia × ¼ inch long were formed.

The pellets were aged or cured at 110° C for 60 minutes in a dry oven *without* the protection of a humid atmosphere or foil covering. The pellets were then fired at 1200° C for 16 hours. Attrition tests with these pellets show attrition losses of 2.6%. Analyses of surface area and soda content were 18 $m^2/g$ and 0.8% $Na_2O$.

EXAMPLE II

A honeycomb structure having a wall thickness of 0.0382 mm and 11.6 cells/$cm^2$ was prepared using a blended powder and extrusion slip. The blended powder consisted of 280 grams of alumina activated as in Example I and subsequently ground to an average particle size of 10 micrometers (microns) and blended with 70 grams of colloidal silica (Cab-O-Sil). The blended product was then mixed with the plasticizer mix described in Example I using a 650 cc Brabender Sigma mixer.

The mix was then extruded through the honeycomb extrusion die (commonly referred to as the monolith die). The extrusion was aged in an organic bath at 80° C for 3 hours. The honeycomb structure was fired at 1400° C for 1 hour to convert it to a mullite crystal phase structure having no free silica. The crushing strength of the monolith was 17 mPa. The surface area of the substrate was 4.5 $m^2/g$. The absence of free silica in the substrate was verified by X-ray diffraction.

What is claimed is:

1. An alumina-silica catalyst support characterized by a high relative surface area, a minimum compressive strength of 6.9 mPa and an abrasive resistance under 5% weight loss, said support comprising initially a mixture of 10–28% by weight colloidal silica and 72–90% by weight of an activated alumina made by exposure to a temperature of at least 400° C for a period not exceeding 4 minutes and which mixture has been subsequently rehydrated and then fired at a temperature of not less than about 600° C nor more than about 1400° C.

2. The support of claim 1 wherein said colloidal silica, when suspended in a liquid, has a basic pH.

3. The support of claim 1 wherein said mixture is extruded as pellets and subsequently rehydrated at a temperature of from 50°–120° C.

4. The support of claim 1 wherein said initial mixture also contains 0.02–8% by total weight of the mixture of a plasticizer to aid in extrusion of the mixture.

5. The support of claim 1 wherein said mixture is extruded into a thin wall object and rehydrated in the presence of moisture at a temperature of from 50°–90° C.

6. The support of claim 1 wherein said support is fired for a period of from 3–16 hours.

7. The support of claim 1 further characterized by a substantial absence of free silica by firing at a temperature above 1200° C.

8. An alumina-silica catalyst support firable to a surface area of about 100 $m^2/g$ at 1000° C and exhibiting a minimum compressive strength of 6.9 mPa and an abrasive resistance under 5% weight loss comprising initially 10–28% by weight colloidal silica and 72–90% by weight of an activated alumina made by exposure to a temperature of at least 400° C for a period not exceeding 4 minutes, which mixture has been subsequently rehydrated at a temperature of at least 50° C and then fired for a period of from 3–16 hours at a temperature of not less than about 600° C nor more than about 1400° C.

* * * * *